(12) United States Patent
Lee et al.

(10) Patent No.: US 11,494,730 B2
(45) Date of Patent: Nov. 8, 2022

(54) FOOD INVENTORY SYSTEM AND METHOD

(71) Applicants: Sun Kyong Lee, Edmonds, WA (US); Jane Y. Lee, Edmonds, WA (US)

(72) Inventors: Sun Kyong Lee, Edmonds, WA (US); Jane Y. Lee, Edmonds, WA (US)

( * ) Notice: Subject to any disclaimer, the term of this patent is extended or adjusted under 35 U.S.C. 154(b) by 398 days.

(21) Appl. No.: 16/673,947

(22) Filed: Nov. 4, 2019

(65) Prior Publication Data

US 2020/0065757 A1 Feb. 27, 2020

Related U.S. Application Data

(63) Continuation-in-part of application No. 15/005,891, filed on Jan. 25, 2016, now Pat. No. 10,467,584.

(51) Int. Cl.
*G06Q 10/08* (2012.01)
*G06K 7/10* (2006.01)
(Continued)

(52) U.S. Cl.
CPC ....... *G06Q 10/087* (2013.01); *G06K 7/10722* (2013.01); *G06K 7/1413* (2013.01);
(Continued)

(58) Field of Classification Search
CPC .. G06Q 10/087; H04N 13/239; H04N 5/2254; G06V 10/17; G06V 20/20;
(Continued)

(56) References Cited

U.S. PATENT DOCUMENTS

| | | | |
|---|---|---|---|
| 7,448,546 B2 * | 11/2008 | Jung | G06Q 10/087 235/375 |
| 2002/0066279 A1 * | 6/2002 | Kiyomatsu | G06Q 10/087 62/125 |

(Continued)

OTHER PUBLICATIONS

"Dockem Koala iPad & Tablet Wall Mount", by Eugene Kim Nov. 28, 2012, available at https://www.kickstarter.com/projects/cmoyer/koala-mount-20-universal-smartphone-and-tablet-wal (Year: 2012).*

(Continued)

*Primary Examiner* — Allen C Chein
(74) *Attorney, Agent, or Firm* — Christopher Mayle; Bold IP, PLLC

(57) ABSTRACT

A food inventory device having a bar code scanner and camera to add and remove inventory items to and from the inventory. The scanner may be mounted on an inventory storage container to facilitate inventory control from one or more storage devices, including refrigerators, freezers, and pantries. The inventory system may display a table listing the inventory items along with variable details. Based on the food inventory list, the inventory system may suggest recipes, display the ingredients in stock for suggested recipes, and create a shopping list of the ingredients not in stock for a desired recipe. The device may have an ordering system allowing users to order items in the storage device that have been exhausted or otherwise need to be replenished through audio or touch input. The ordering system may be connected to third-party external sites and may be based on one or more user profile settings.

1 Claim, 14 Drawing Sheets

(51) Int. Cl.
*G06K 7/14* (2006.01)
*H04N 13/239* (2018.01)
*H04N 5/225* (2006.01)
*G06V 10/10* (2022.01)
*G06V 20/20* (2022.01)

(52) U.S. Cl.
CPC ........... *G06K 7/1443* (2013.01); *G06V 10/17* (2022.01); *G06V 20/20* (2022.01); *H04N 5/2254* (2013.01); *H04N 13/239* (2018.05); *G06T 2207/30128* (2013.01)

(58) Field of Classification Search
CPC ............. G06K 7/10722; G06K 7/1413; G06K 7/1443; G06T 2207/30128
See application file for complete search history.

(56) References Cited

U.S. PATENT DOCUMENTS

| | | | | |
|---|---|---|---|---|
| 2002/0178066 | A1* | 11/2002 | Roh | G06Q 30/06 705/22 |
| 2008/0292141 | A1* | 11/2008 | Yu | G06K 9/228 382/106 |
| 2010/0187306 | A1* | 7/2010 | Solomon | B65G 1/137 235/385 |
| 2012/0094258 | A1* | 4/2012 | Langheier | G16H 20/30 434/127 |
| 2016/0063692 | A1* | 3/2016 | Divakaran | G06K 9/6202 382/110 |
| 2016/0162715 | A1* | 6/2016 | Luk | F25D 29/005 235/385 |
| 2020/0088463 | A1* | 3/2020 | Jeong | F25D 29/00 |

OTHER PUBLICATIONS

"iPad Cases than Can Survive Young Kids", snapshot taken Jan. 2014, available at https://web.archive.org/web/20140415000000*/https://parentingchaos.com/ipad-cases-for-kids/ (Year: 2014).*

Arthurs, "Put the chocolate down! The talking diet fridge that keeps your weight in check", Jan. 2012. https://www.dailymail.co.uk/femail/article-2084729/ThinQ-Smart-refrigerator-Talking-diet-fridge-keeps-weight-check.html (Year: 2012).*

* cited by examiner

Fig. 10

| Category | Name | Image | Expiry Date | Stored | Qty | Delete | Edit |
|---|---|---|---|---|---|---|---|
| Miscellaneous | Campbell Chicken noodle soup | | | 25 Days ago | 1 | ☐ | ☐ |
| Drink | Pepsi Wild Cherry | | | 15 Days ago | 5 | ☐ | ☐ |
| Vegetable | Carrot | | | 10 Days ago | 3 | ☐ | ☐ |
| Fruit | Apple | | | 9 Days ago | 10 | ☑ | ☐ |
| Drink | Snapple Peach Tea | | | 7 Days ago | 1 | ☐ | ☐ |
| Miscellaneous | Spaghetti | | | 2 Days ago | 1 | ☐ | ☐ |
| Drink | Chocolate Milk 1% Gallon | | | 1 Day ago | 1 | ☐ | ☐ |

Main
My Fridge 1 2 3 4 5 >>

Delete     Edit

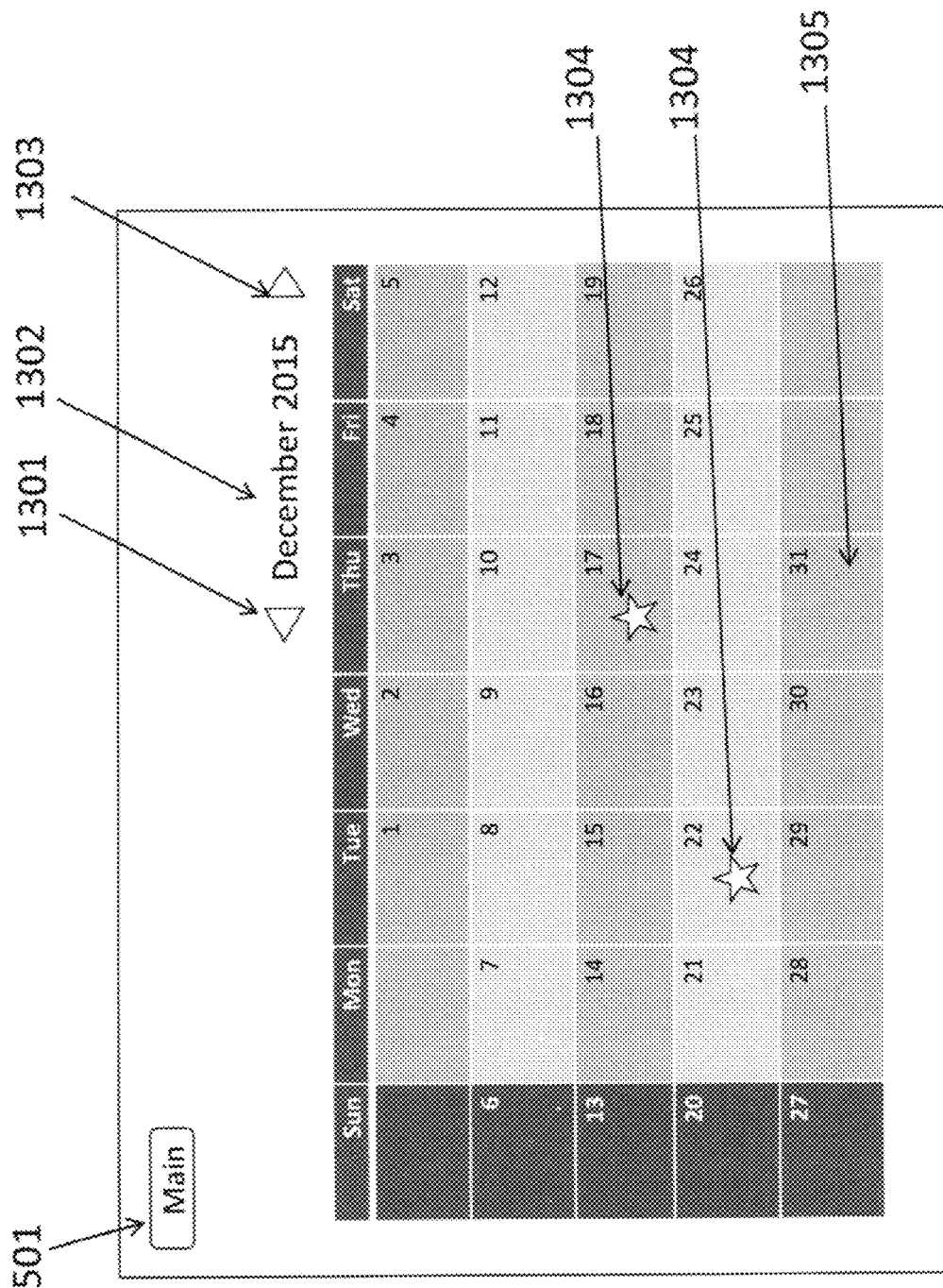

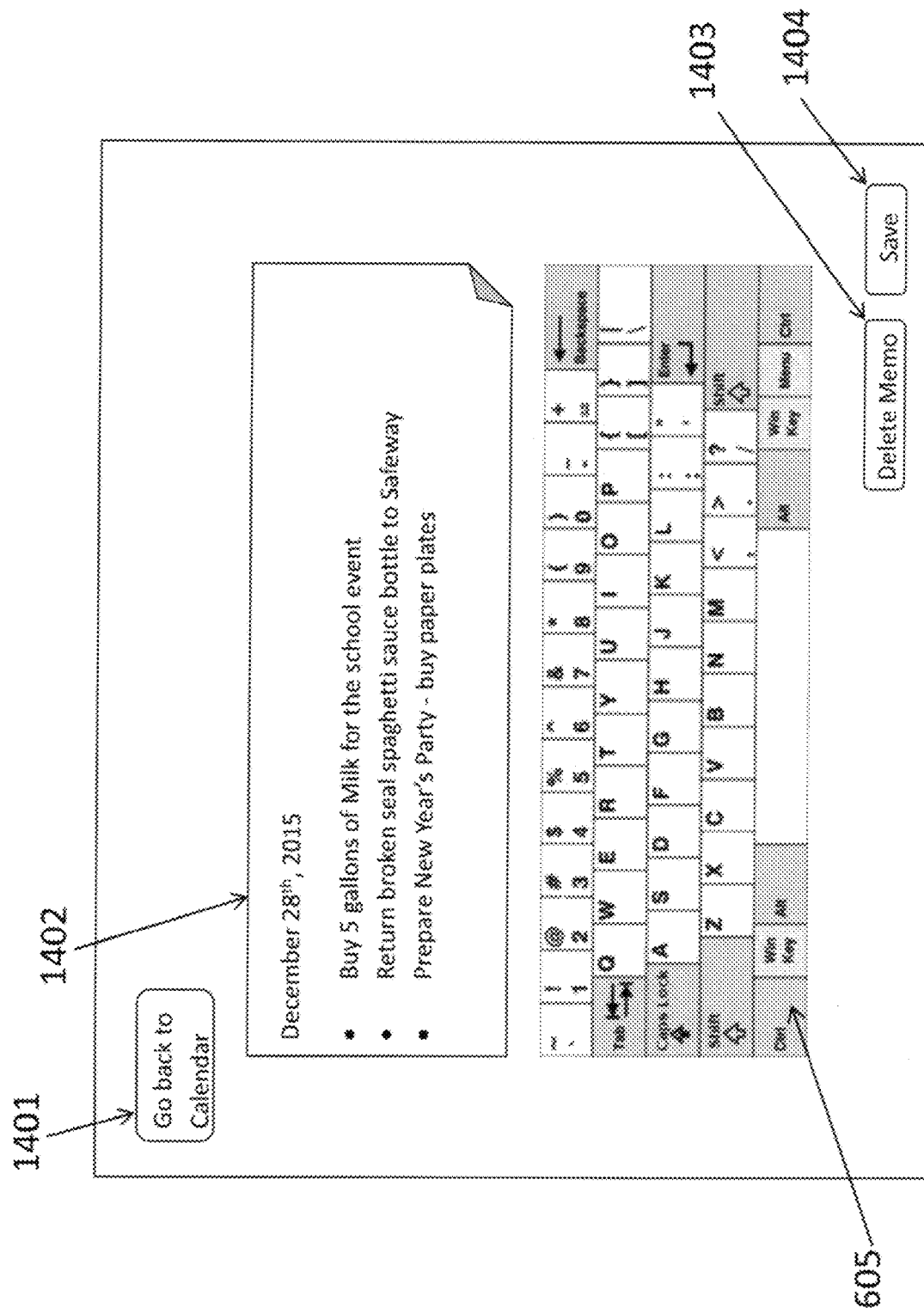

FOOD INVENTORY SYSTEM AND METHOD

CROSS REFERENCE TO RELATED APPLICATIONS

This application is a continuation in part which claims priority to U.S. Non-Provisional application Ser. No. 15/005,891 filed on Jan. 25, 2016, which is incorporated by reference in its entirety.

FIELD OF THE DISCLOSURE

This disclosure relates generally to the field of methods and systems for inventory management of foods, beverages, or other items which are commonly stored and consumed in a household.

BACKGROUND

A refrigerator is a standard appliance found in almost every modern home. The technology discussed below falls into the category of inventory management of foods, beverages, or other items which are commonly stored in a household.

For many households, especially families or those with multiple adults living in the same home, the refrigerator, freezer, and pantry can get disorganized and overfull making it hard to know what exactly is or is not in the refrigerator, freezer, or pantry. When people don't know what food items they have, it can lead to people accidentally purchasing duplicate items, forgetting about items on a shopping list or recipe, or allowing perishable foods to rot and become waste.

There have been attempts at solving this food inventory management problem. However, many current attempts are overly complicated and too expensive to install for the majority of homeowners. Other attempts put too much of a time burden on users, so that it becomes inconvenient to manage the food inventory and users lose motivation to keep up with the system. Still others have no way to communicate to users the inventory when they are not at home and are at the store.

SUMMARY

The present invention is directed to a food inventory system comprising one or more databases, the databases stored in a memory, wherein at least one database is an inventory database, the inventory database comprising one or more inventory items placed in a storage container, one or more processors coupled to the one or more databases, and at least one computing device coupled to the one or more processors and the one or more databases; wherein the one or more processors are configured to: updating the inventory database with the one or more inventory items by capturing identifying information of the inventory items being placed in the storage container, updating the inventory database by capturing identifying information of the one or more inventory items being removed from the storage container, and presenting a user interface on the computing device, wherein the user interface comprises a display of a listing of the one or more inventory items in the storage container from the inventory database along with variable details; the one or more inventory items in the storage container, the one or more inventory items sortable by details, comprising storage date, category type, name of the one or more inventory items in the storage container, number of days the one or more inventory items in the storage container were stored in the storage container, expiration date of the one or more inventory items in the storage container, and quantity of the one or more inventory items in the storage container, the food inventory system further comprising a bar code reader, the bar code reader configured to capture identifying information of the one or more inventory items, wherein the identifying information of the one or more inventory items is searched in a barcode database stored in the memory or through a barcode database API over the internet to recognize the one or more inventory items, the food system further comprising a camera having a camera lens, the camera configured to capture identifying information of the one or more inventory items, wherein the identifying information of the one or more inventory items is searched using an image recognition API stored in the memory to recognize the one or more inventory items whose identifying information has been captured by the camera, the food inventory system further comprising a camera sensor configured to sense the one or more inventory items placed within a predetermined range of the camera, the camera sensor configured to activate the camera lens when the one or more inventory items are located within range of the camera, wherein the camera sensors when activated captures identifying information of the one or more inventory items in range, the food inventory system further comprising a mounting bracket, the mounting bracket configured to couple the storage container to the computing device, the mounting bracket configured to allow the computing device to slide in and out of the mounting bracket, the mounting bracket further comprising one or more holes in the mounting bracket configured to allow the camera lens on the computing device to see through and take images of inventory items and to allow the camera sensor on computing device to see through and sense the one or more inventory items, the food inventory system further comprising a microphone, wherein the one or more processors are further configured to: receiving and process sound into electrical signals; and updating the inventory database in response to the electrical signals, the food inventory system further comprising a speaker, wherein the one or more processors are further configured to: receive and process electric signals into sound, notifying the user through speaker in response to user input or event, wherein the processors are further configured to: order inventory items when an action occurs, wherein the processors are further configured to: order inventory items when user inputs a request to order inventory items, wherein the processors are further configured to: order inventory items wherein the percentage of a particular inventory item located in storage container drops below a predetermined percentage, wherein the processors are further configured to: order inventory items wherein the percentage of a particular inventory item located in storage container drops below a predetermined percentage of the overall amount of the particular inventory item stored of a predetermined amount of time, wherein the processors are further configured to: uploading a user profile in the databases, the user profile used to analyze when to order the inventory items.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

FIG. 10 is an embodiment of a sub-screen for viewing the list of items in the inventory system.

FIG. 13 is an embodiment of a sub-screen for a calendar with memo capability.

FIG. 14 is an embodiment of a sub-screen for a calendar memo.

DEFINITIONS

Figure 1:
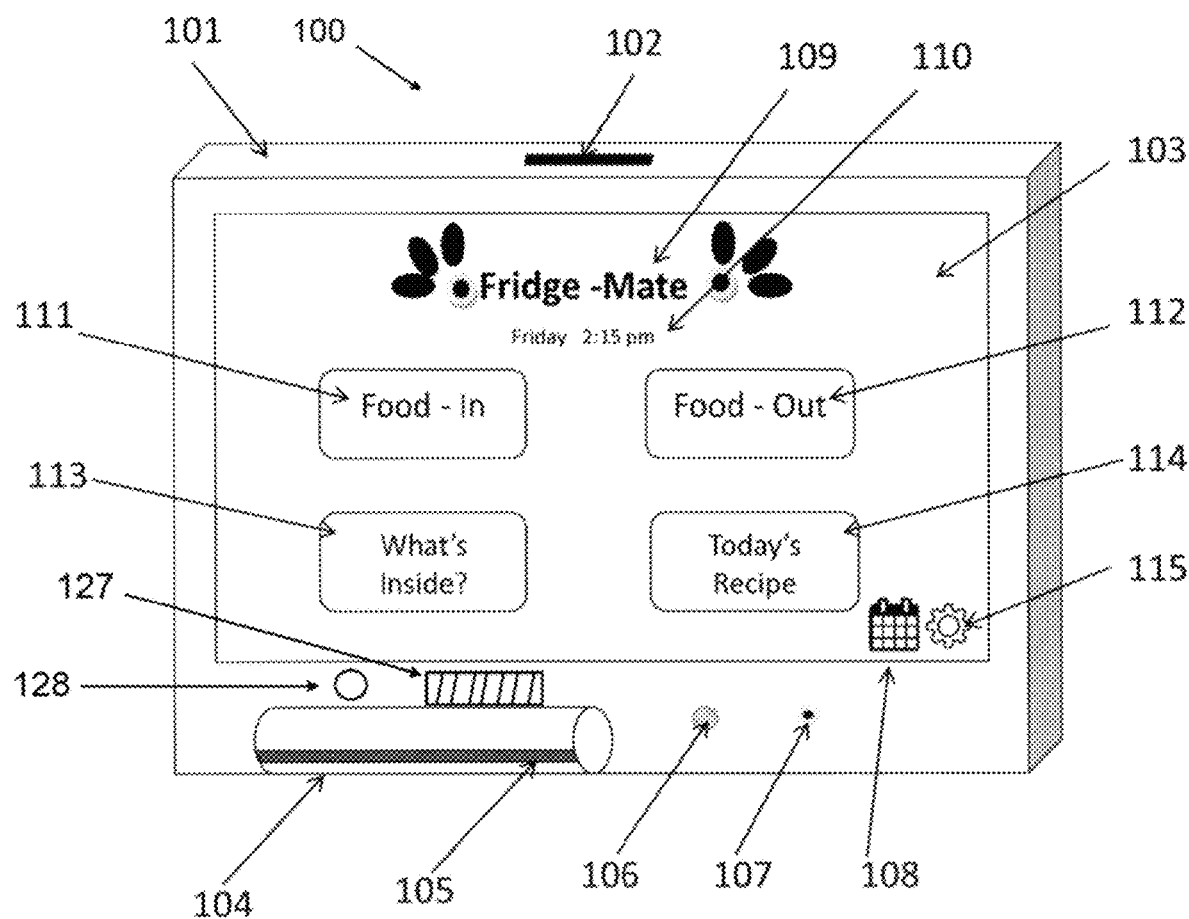
FIG. 1 is an embodiment of the front panel of the electronic device.

"Food-In": a main menu option on the main screen to enter items into the inventory system.

"Food-Out": a main menu option on the main screen to remove items from the inventory system.

"Main": a sub-screen option to bring the screen on the device to the main menu.

"Today's Recipe": a main menu option on the main screen to obtain recipe suggestions based on ingredients in the inventory system.

"Use Camera": a sub-screen option to initiate the process of taking an image of an item.

"Use Scanner": a sub-screen option to initiate the process of scanning an item.

"What's Inside?": a main menu option on the main screen to view the inventory list.

DETAILED DESCRIPTION

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure is generally drawn, inter alia, to systems, apparatus, and methods therein relating to inventory management of foods, beverages, or other items which are commonly stored and consumed in a household. In the preferred embodiments, a portable device with customized software installed enables users to manage inventory of food items in multiple locations by barcode, image, and manual entries.

The present invention is an electronic device with customized software installed, which can be mounted directly on the door of a refrigerator or on the wall. The device keeps track of food items that go in and out of the refrigerator, multiple fridges, freezers, or pantry by capturing either the bar-code on the food item or the images of the food item.

The device may be connected to the home wireless internet (Wi-Fi) so that its inventory information can be communicated and accessed by smart phones, laptops, and other internet connected device remotely.

Because the user can access the food inventory status from the device, the user can make an informed decision on purchasing food items. Redundant food purchases and unnecessary trips to the grocery can be avoided when the device shows exactly what is in the refrigerator.

The device may suggest recipes based on what is in the refrigerator and the time of the day so that the user can better consume food items in one's refrigerator and avoid forgetting them and letting them expire and go to waste. For example, breakfast recipes may be presented in the morning time. The device may suggest recipes when all of the ingredients are present in the inventory system. Alternatively, the device may suggest recipes when some of the ingredients are present in the inventory system and optionally create a shopping list for the ingredients that are not in the inventory system.

In addition, the user can search specific recipes based on the category on the device software. Once the user chooses a specific recipe, the device software may show what food ingredients are in the refrigerator and what food ingredients are missing. In addition, the device may create a shopping list based on what is needed for the recipe. The shopping list may be shared across multiple users. In some examples, the user may desire to check off the list when the ingredients on the shopping list were purchased.

In addition, the user can make a grocery shopping plan by utilizing a calendar function in the device. The calendar function offers memo capability for the user and can be shared across multiple users.

The overall idea is to save money on the food that may have been wasted in the refrigerator, save time by reducing the number of grocery trips, and having fun times cooking in the kitchen by following recipes that are customized by what is in the refrigerator.

In some embodiments, the device has a touch screen on the front facing the user and several components integrated perform food inventory management. Users may access a user interface through image recognition application program interface (API). User interface may have a plurality of buttons or icons that are selectable by user to perform particular processes in response to the selections The device is operated by custom software and the power is supplied by an internal, rechargeable battery. The battery may be charged by plugging the device into a charging station.

In some embodiments, the device may be configured to manage inventory in multiple locations, such as multiple refrigerators, freezers, and pantry.

FIG. 1 is an embodiment of the front panel of electronic device 100. FIG. 1 includes a hard cover case 101, a charging slot 102, a screen 103, a bar code reader 104, a bar code scanner window 105, a camera lens 106, a camera sensor 107, a graphic calendar icon 108, a brand name and logo 109, a date and clock time 110, a graphic "Food-In" button 111, a graphic "Food-Out" button 112, a graphic "What's Inside" button 113, a graphic "Today's Recipe" button 114, and a graphic user settings button 115. In FIG. 1, hard cover case 101 is preferably made out of hard material like plastic to protect the device from damage. Charging slot 102 is a slot for the universal serial bus (USB) pin in the charging station, shown in FIGS. 3 and 4, to charge the device and update software.

In FIG. 1, screen 103 is a touch-screen made of glass, plastic, or other commonly used touch-screen surface. Screen 103 may be back-lit by LCD, LED, Plasma, or other commonly used screen lighting technology. Screen 103 may be attached to and removable from hard cover case 101. Bar code reader 104, located on the bottom left of the device, is a bar code reader component that may be angle adjustable by rotating the angle of bar code scanner window 105. To the right of bar code reader 104 is camera lens 106. Camera lens 106 may be used for capturing images of food to inventory food items. To the right of camera lens 106 is camera sensor 107. Camera sensor 107 senses items placed within camera range, preferably up to 10 inches away from camera sensor 107, and activates camera lens 106 when an item in range is detected. The device uses bar code reader 104 and image recognition application program interface (API) to recognize food items when the user scans the item or camera lens 106 captures an image of the item before placing it in the inventory, such as a refrigerator or pantry. Speed of processing time can vary based on dependent variables, such as the home Wi-Fi network band speed, home internet connection speed, and bar code and image recognition speed. The device may download the bar code database of food items to reduce the overhead time of the internet speed. However, periodic database updates may be required.

In FIG. 1, the home screen preferably shows the brand name and logo 109 at the top center of screen 103. Just below brand name and logo 109 is day and time 110, which displays the current day of the week and time. The home screen also shows one or more menu options, "Food-In" button 111, "Food-Out" button 112, "What's Inside?" button 113, "Today's Recipe" button 114, graphic calendar icon 108, and graphic user settings button 115.

In FIG. 1, graphic "Food-In" button 111 is used to enter food items into the inventory system. The graphic "Food-Out" button 112 is used to remove food items from the inventory system. The graphic "What's Inside?" button 113 is used to view a list of inventory items with various details. The graphic "Today's Recipe" button 114 is used to get recipe suggestions based on the contents in the inventory system and to create shopping lists. Graphic calendar icon button 108 is used to enter or view memos for a specific calendar date. The home screen menu items are discussed in further detail in subsequent figures.

In FIG. 1, user settings button 115 allows a user to set a current time, connect to home Wi-Fi, turn off API service(s), adjust backlit brightness, add users, and set administrative security password.

Figure 2:
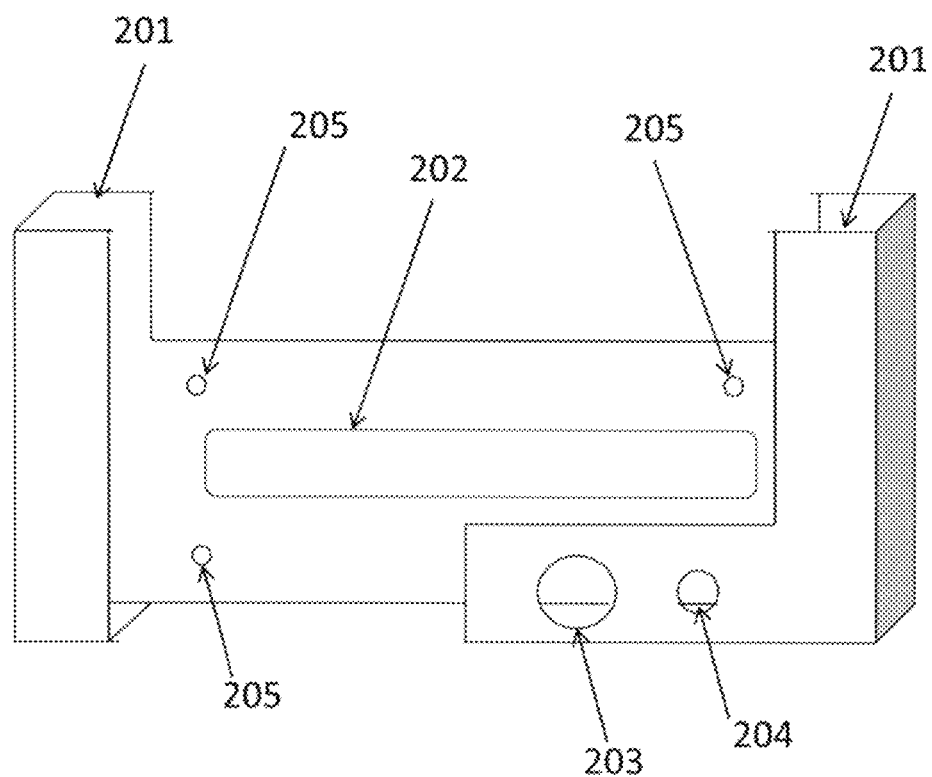
FIG. 2 is an embodiment of the mounting bracket for the electronic device.

FIG. 2 is an embodiment of the mounting bracket for the electronic device. FIG. 2 includes a mounting bracket 201, a mounting pad 202, a camera lens hole 203, a camera sensor hole 204, and wall mounting holes 205. In FIG. 2, mounting bracket 201 may be made of hard material comprising plastic and metal. Mounting bracket 201 may be attached to a door of a refrigerator, a wall, or other hard surface where the device may be frequently accessed. Behind mounting bracket 201 is mounting pad 202, which may be configured to be a sticky patch or magnet that may adhere to a desired hard surface location and hold the weight capacity of at least five pounds. Alternatively, mounting pad 202 may be configured with a hook or some sort of hanging system to secure onto a desired location. In addition, mounting holes 205 located on the back part of mounting bracket 201 may be used to attach mounting bracket 201 to a surface with screws. The device may easily slide in and out of mounting bracket 201 for easy access. Camera lens hole 203 is a hole in mounting bracket 201 to allow camera lens 106 on the device to see through and take images of food items. Camera sensor hole 204 is a hole in mounting bracket 201 to allow camera sensor 107 on the device to see through and sense food items.

Figure 3:
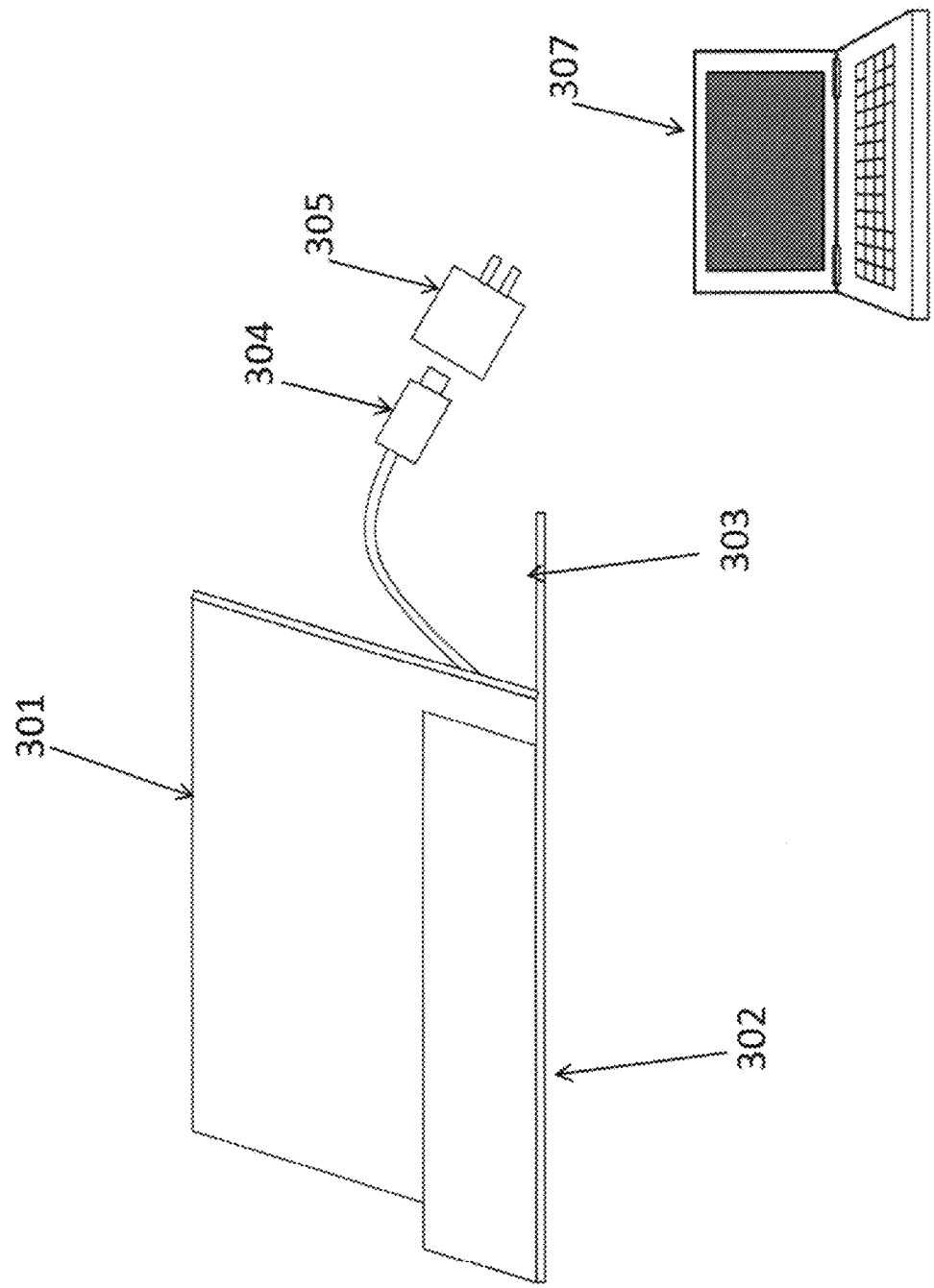
FIG. 3 is an embodiment of the charging station for the electronic device.

FIG. 3 is an embodiment of the charging station for the electronic device. FIG. 3 includes a back-board 301, a front-board 302, a base-board 303, a universal serial bus (USB) connector 304, a wall charger 305, and a computing device 307. In FIG. 3 is a charging station for the device shown in FIG. 1. The charging station may be placed on a table or countertop near an outlet to charge the device. The device may be operable while connected to the charging station. Back-board 301 may be configured to allow the device to slide in to the charging station and allow the device to lean against back-board 301 while charging. Front-board 302 assists in securing the device in place by covering some portion of the device. Base-board 303 may be configured to stabilize the entire charging station to be upright, including the device while charging. Base-board 303 may also be configured to prevent the charging station from falling backwards.

In FIG. 3, USB connector 304 is a serial port connection for charging and updating software for the device. USB connector 304 may be directly plugged into computing device 307 for software updates and recharging the internal battery. USB connector 304 may also be directly plugged in to wall charger 305. Wall charger 305 may be configured to connect to a USB connector on one side and an electrical outlet on another side. Wall charger 305 may be configured to be a 120 volt or 240 volt outlet charger.

Figure 4:
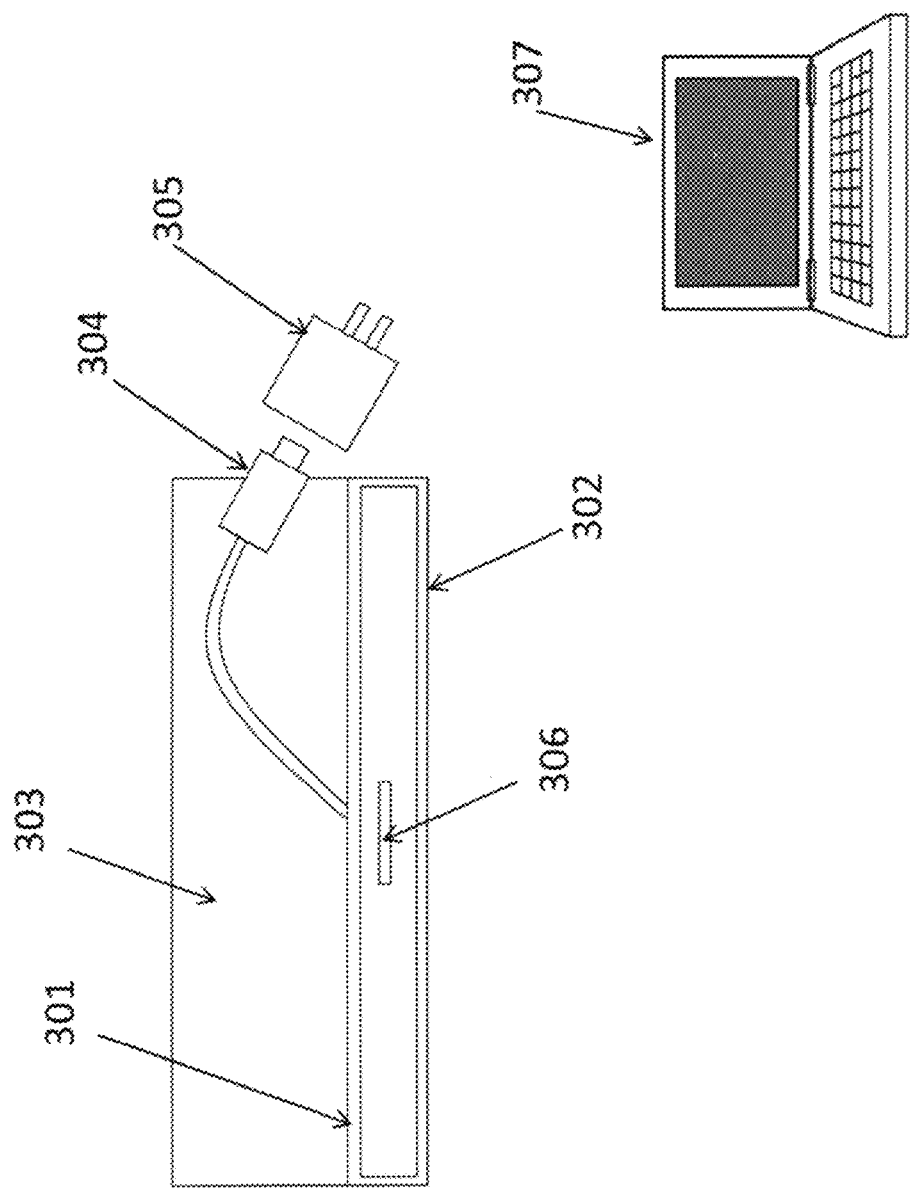
FIG. 4 is a top-view embodiment of the charging station for the electronic device.

FIG. 4 is a top-view embodiment of the charging station for the electronic device. FIG. 4 includes a back-board 301, a front-board 302, a base-board 303, a USB connector 304, an electrical plug 305, a multi-pin USB plug 306, and a computing device 307. In FIG. 4, back-board 301, front-board 302, base-board 303, USB connector 304, and electrical plug 305 function as described above in FIG. 3. Multi-pin USB plug 306 plugs into charging slot 102 in FIG. 1 to charge the device and update software from computing device 307.

Figure 5:
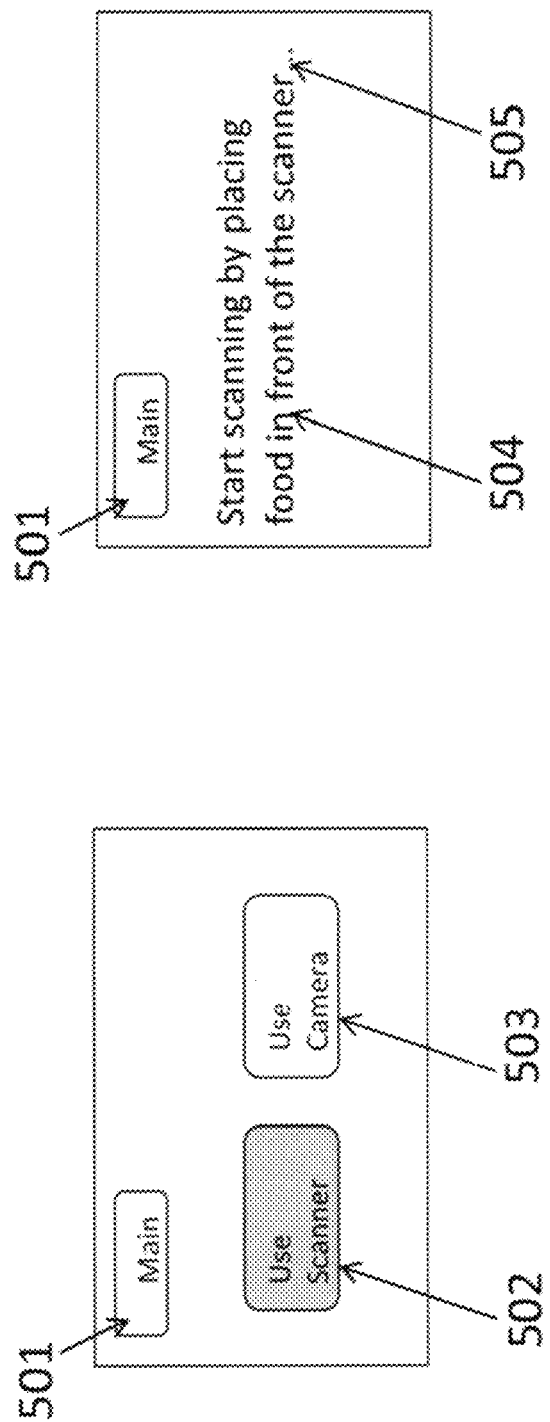
FIG. 5 is an embodiment of sub-screens for entering food items in the inventory system by scanner.

FIG. 5 is an embodiment of sub-screens for entering food items in the inventory system by scanner. FIG. 5 includes a graphic "Main" button 501, a graphic "Use Scanner" button 502, a graphic "Use Camera" button 503, a set of instructions 504, and a set of blinking ellipses 505. In FIG. 5, two sub-screens are shown. The sub-screen on the left appears when "Food-In" button 109 is selected. The sub-screen on the right appears when "Use Scanner" button 502 is selected. Graphic "Main" button 501 may be selected at any time to return to the main screen shown in FIG. 1. Set of instructions 504 instructs the user to scan a food item by placing the item in front of the scanner. Blinking ellipses 505 appears to indicate to the user that bar code scanner 104 has been activated and ready to scan an item. After a food item has been scanned, the software program in the device searches the Barcode Database to recognize the product. The device may be configured to search through a downloaded database within the device or it may search through a barcode database API over the internet. After the device has scanned the item and searched a barcode database, screens shown in FIG. 6 appear.

Figure 6:
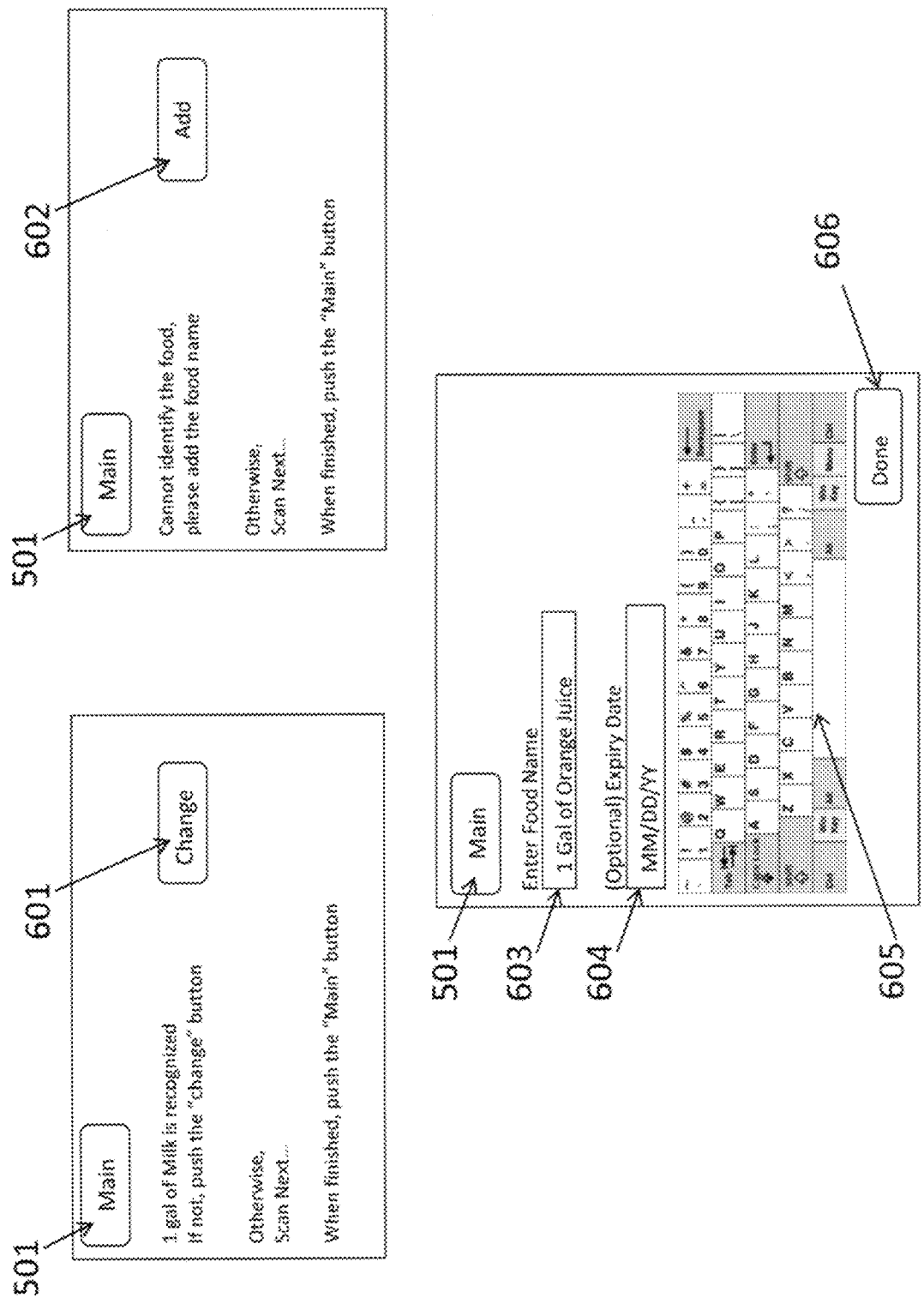
FIG. 6 is an embodiment of additional sub-screens for entering food items in the inventory system by scanner.

FIG. 6 is an embodiment of additional sub-screens for entering food items in the inventory system by scanner. FIG. 6 includes a graphic "Main" button 501, a graphic "Change" button 601, a graphic "Add" button 602, a graphic text box 603, a graphic text box 604, a graphic alphanumeric keyboard 605, and a graphic "Done" button 606. In FIG. 6, additional sub-screens for entering food items in the inventory system by scanner are shown. The two upper sub-screens are the two sub-screens, one or the other, that appear after the device has scanned an item and searched a barcode database. The sub-screen on the left is shown when the scanned item is recognized and gives the user an opportunity to make changes via graphic "Change" button 601. The sub-screen on the right is shown when the scanned item is not recognized and gives the user an opportunity to add the item manually via graphic "Add" button 602. Graphic "Main" button 501 may be selected at any time to return to the main screen shown in FIG. 1.

When the graphic "Change" button 601 or "Add" button 602 is selected, the sub-screen displayed on the bottom appears. This screen allows the user to enter the food name in text box 603 and optionally the expiration date in text box 604 by using alphanumeric keyboard 605. When the graphic "Done" button 606, located on the bottom right is selected, the device saves the entered information in the device's database along with a time stamp and returns to the scanning screen shown in FIG. 5; the right sub-screen of the two shown. Graphic "Main" button 501 may be selected at any time to return to the main screen shown in FIG. 1.

Figure 7:
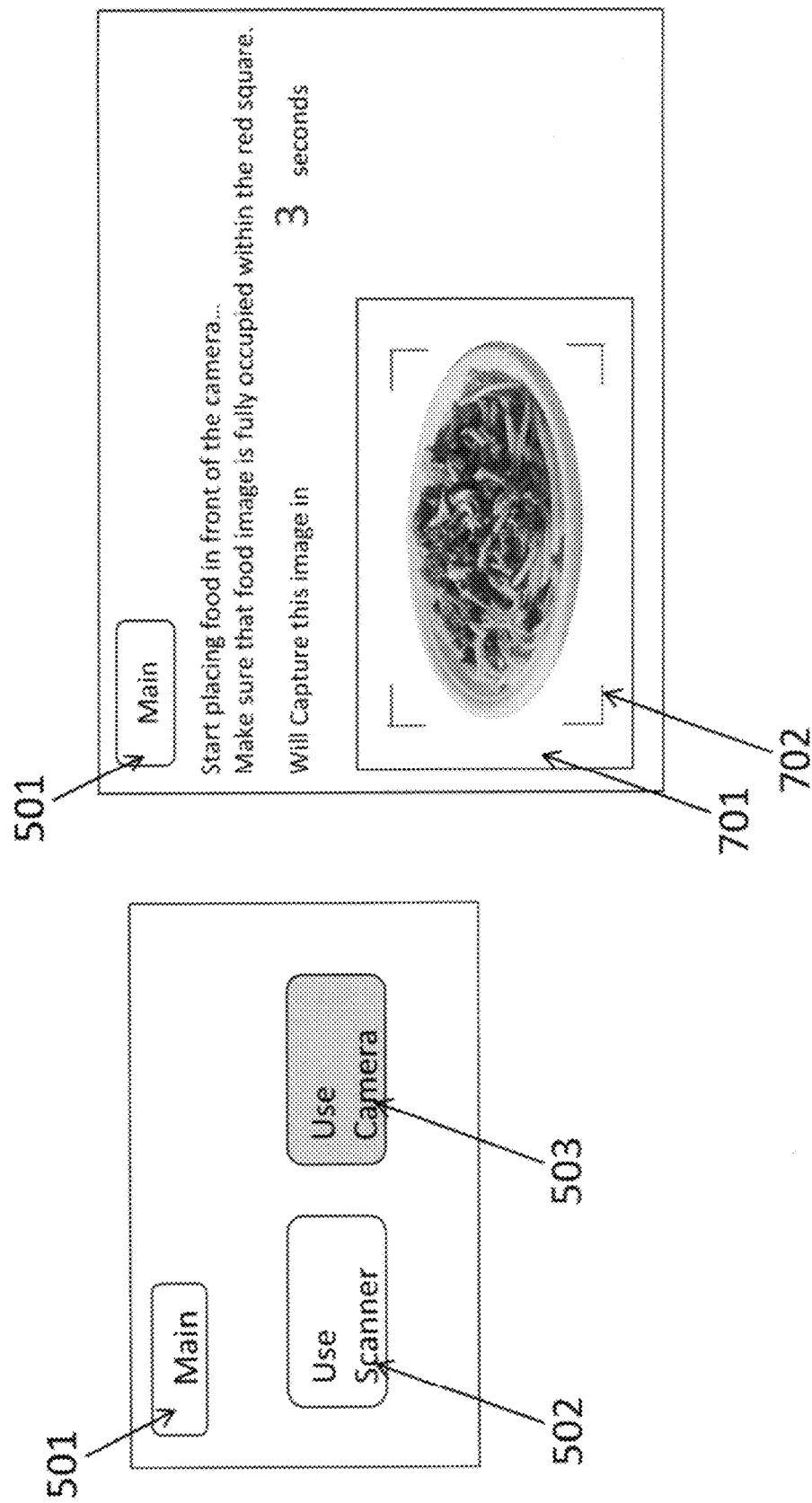
FIG. 7 is an embodiment of sub-screens for entering food items in the inventory system by camera.

FIG. 7 is an embodiment of sub-screens for entering food items in the inventory system by camera. FIG. 7 includes a graphic "Main" button 501, a graphic "Use Scanner" button 502, a graphic "Use Camera" button 503, a graphic picture box 701, and a graphic red box 702. In FIG. 7, two sub-screens are shown. The sub-screen on the left appears when "Food-In" button 109 is selected. The sub-screen on the right appears when "Use Camera" button 503 is selected. When the screen on the right appears, the device instructs the user to place the food item in front of the camera and to adjust the location of the food so that the image the camera captures in graphic picture box 701 fits within the graphic red box 702. Once the image of the food item fully occupies the graphic red box 702, an automatic count-down initiates and the camera captures an image. The device then uses software to recognize the food item by using image recognition API. The device may be configured to allow the user to disable the image recognition API to cut the additional recognition time, which prompts the device to simply put the image in the device's database with the time stamp. Graphic "Main" button 501 may be selected at any time to return to the main screen shown in FIG. 1.

Figure 8:
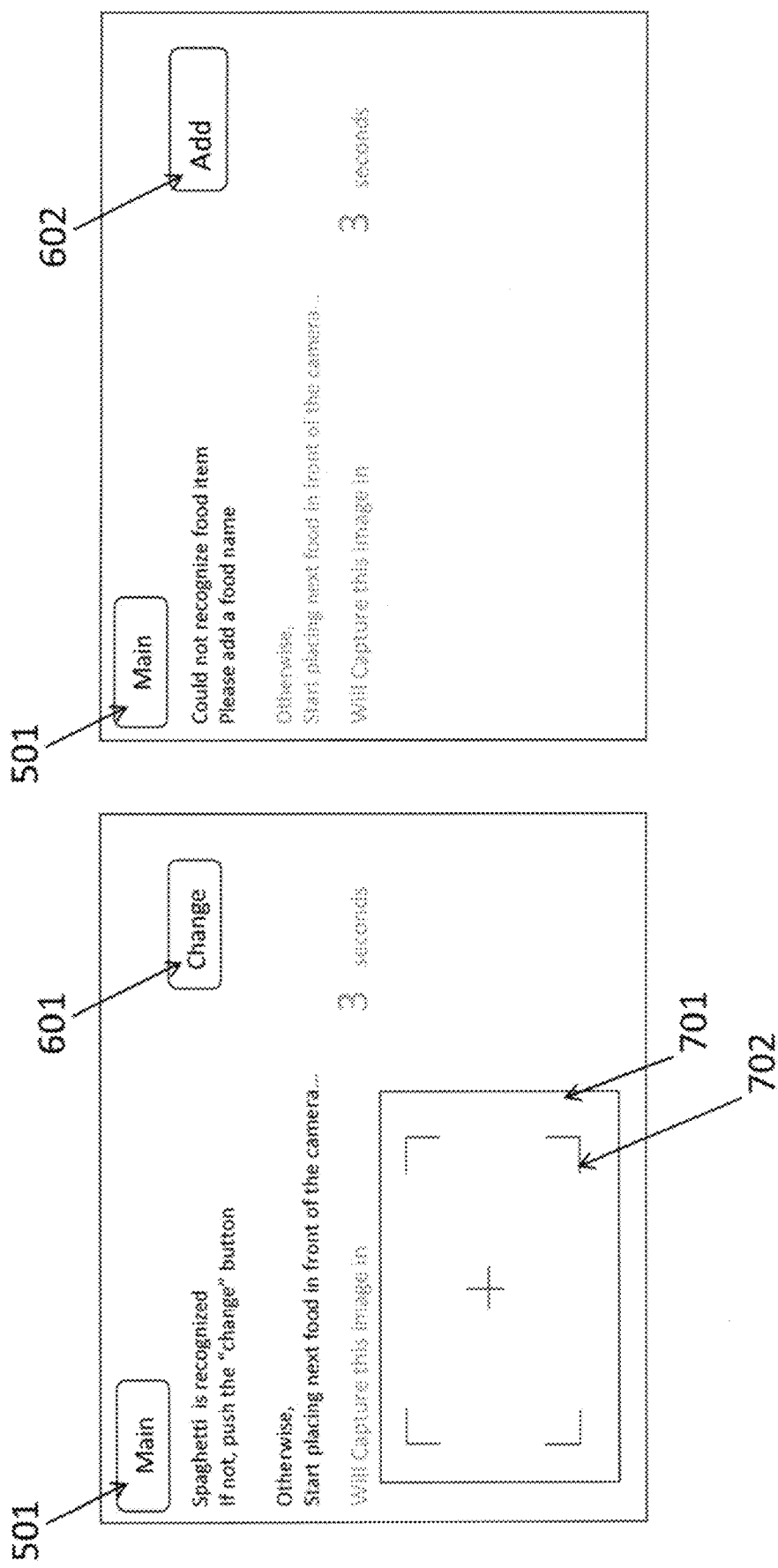
FIG. 8 is an embodiment of additional sub-screens for entering food items in the inventory system by camera.

FIG. 8 is an embodiment of additional sub-screens for entering food items in the inventory system by camera. FIG. 8 includes a graphic "Main" button 501, a graphic "Change" button 601, a graphic "Add" button 602, a graphic picture box 701, and a graphic red box 702. In FIG. 8, additional sub-screens for entering food items in the inventory system by camera are shown. The two sub-screens are the two sub-screens, one or the other, that appear after the device has captured an image of the food item. The sub-screen on the left is shown when the image of the item is recognized and gives the user an opportunity to make changes via graphic "Change" button 601. Additionally, the user is prompted to place the next food item in front of the camera and repeat the process to enter a food item into the inventory by camera. The sub-screen on the right is shown when the image of the item is not recognized and gives the user an opportunity to add the item manually via graphic "Add" button 602. When the graphic "Change" button 601 or graphic "Add" button 602 are selected, a sub-screen similar to the one in the bottom of FIG. 6 appears and the information is inputted accordingly. Graphic "Main" button 501 may be selected at any time to return to the main screen shown in FIG. 1.

Figure 9:
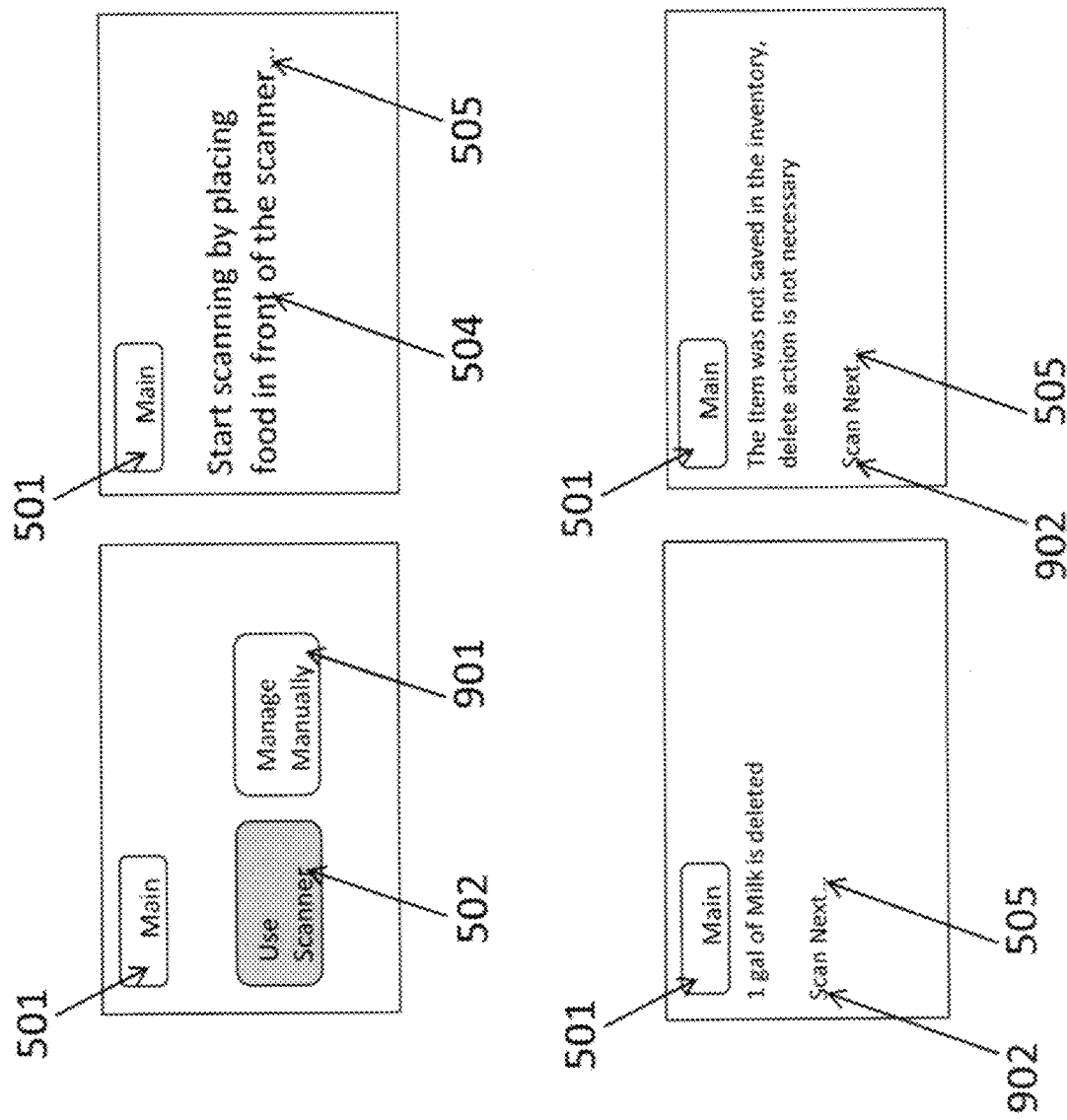
FIG. 9 is an embodiment of sub-screens for removing food items from the inventory system by scanner.

FIG. 9 is an embodiment of sub-screens for removing food items from the inventory system by scanner. FIG. 9 includes a graphic "Main" button 501, a graphic "Use Scanner" button 502, a graphic "Manage Manually" button 901, a set of instructions 504, a set of blinking ellipses 505, and a set of instructions 902. The sub-screen on the upper left appears when "Food-Out" button 110 is selected. The sub-screen on the upper right appears when "Use Scanner" button 502 is selected. Graphic "Main" button 501 may be selected at any time to return to the main screen shown in FIG. 1. Set of instructions 504 instructs the user to scan a food item by placing the item in front of the scanner. Blinking ellipses 505 appears to indicate to the user that bar code scanner 104 has been activated and ready to scan an item. After a food item has been scanned, the software program in the device searches the Barcode Database within the device to recognize the product. After the device has scanned the item and searched the barcode database, one of the bottom two sub-screens appear.

The sub-screen on the bottom left appears if the item is recognized, the device deletes the item from its records, and prompts the user with the next instruction 902 to scan the next item to remove from its inventory list. The sub-screen on the bottom right appears if the item was not recognized, nothing happens to the inventory list, and the user is prompted to scan the next item via instructions 902. Selecting the graphic "Manage Manually" button 901 results in the same process as described for selecting graphic "What's Inside?" button 113 shown on the main screen in FIG. 1. Graphic "Main" button 501 may be selected at any time to return to the main screen shown in FIG. 1.

FIG. 10 is an embodiment of a sub-screen for viewing the list of items in the inventory system. FIG. 10 includes a graphic "Main" button 501, a sorting arrow 1001, a check box 1002, a check box 1003, a check box 1004, a check box 1005, a set of page numbers 1006, a graphic "Delete" button 1007, and a graphic "Edit" button 1008. In FIG. 10, the sub-screen shown appears when a user selects the graphic "What's Inside" button 113 on the main screen shown in FIG. 1. The sub-screen shows a table listing the inventory items along with variable details that may be sorted by storage date by selecting sorting arrow 1001. Some of the details displayed include category type, name of the food item, number of days the item was stored, the expiration date, and quantity of items. Page numbers 1006 allows the user to jump to different parts of the inventory list. Check box 1002 allows the user to select all of the check boxes in the "Delete" column for removal from the inventory list. Check box 1003 allows the user to select all of the check boxes in the "Edit" column for detail modification. Selecting graphic "Delete" button 1007 removes the items with checked boxes from the inventory list. Selecting graphic "Edit" button 1008 allows the user to modify the details of the items with checked boxes. For example, to remove apples from the inventory list, check box 1004 would be checked and then graphic "Delete" button 1007 would be selected to finalize removal of apples from the inventory list. To modify the details for apples, check box 1005 would be checked and then graphic "Edit" button 1008 would be selected to edit the details, which is discussed in further detail in the next figure.

Figure 11:
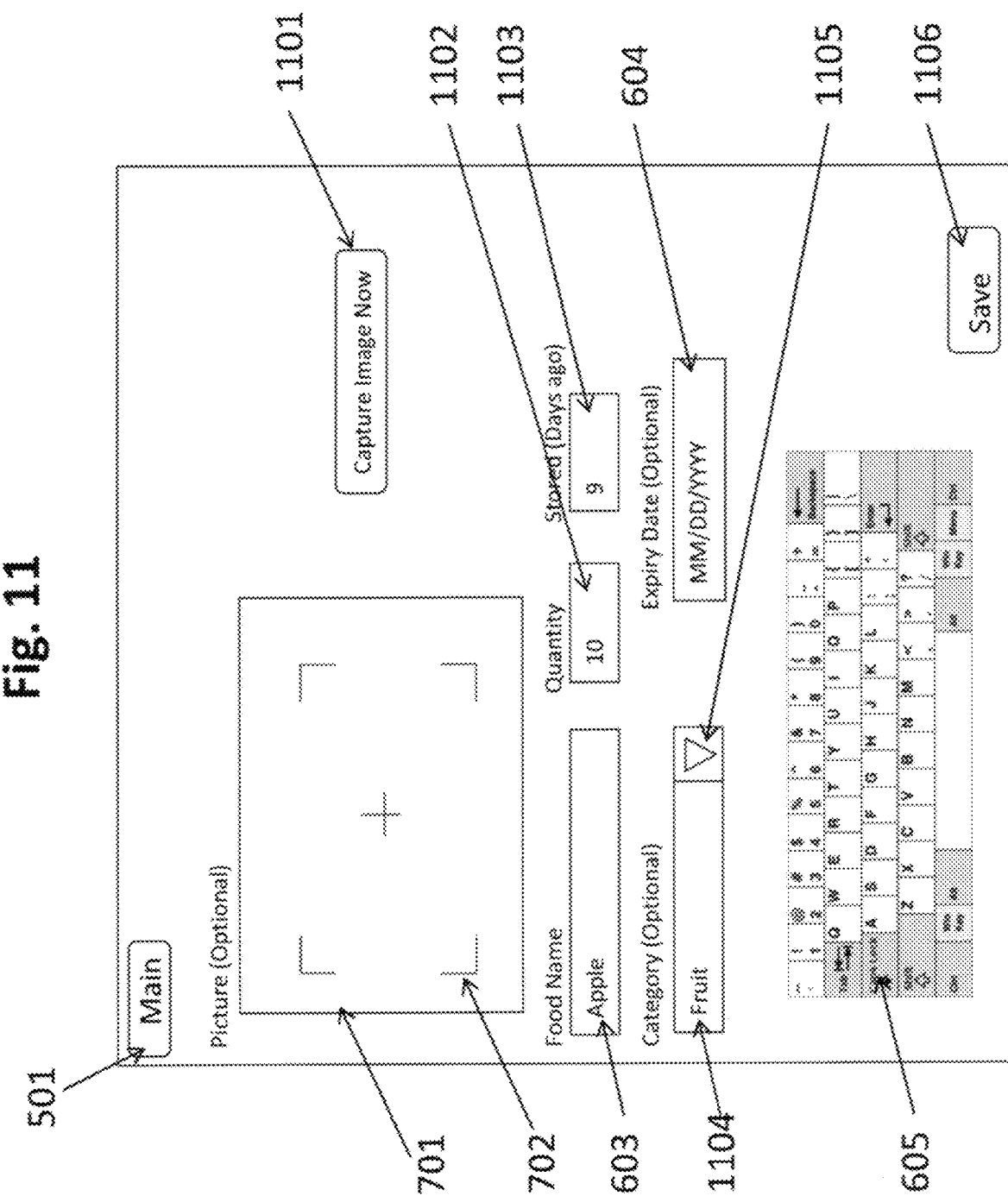
FIG. 11 is an embodiment of a sub-screen for editing the details of an item in the inventory system.

FIG. 11 is an embodiment of a sub-screen for editing the details of an item in the inventory system. FIG. 11 includes a graphic "Main" button 501, a graphic picture box 701, a graphic red box 702, a graphic text box 603, a graphic text box 604, a graphic alphanumeric keyboard 605, a graphic "Capture Image Now" button 1101, a graphic text box 1102, a graphic text box 1103, a graphic text box 1104, a drop-down arrow 1105, and a graphic "Save" button 1106. In FIG. 11, a sub-screen to modify the details of a food item is shown. Picture box 701 and red box 702 allow the user to capture an image for the food item when graphic "Capture Image Now" button 1101 is selected. The user may modify the food name in text box 603, the quantity of the food items in text box 1102, the number of days the food item has been stored in text box 1103, the category of the food item in text box 1104, and the expiration date of the food item in text box 604. For example, the category of the food item may be selected using drop-down arrow 1105 to select "Fruit" for text box 1104. As another example, the quantity of the item may be lowered by a value of one by using alphanumeric keyboard 605. Selecting graphic "Save" button 1106 will save the data modified and entered. Graphic "Main" button 501 may be selected at any time to return to the main screen shown in FIG. 1.

Figure 12:
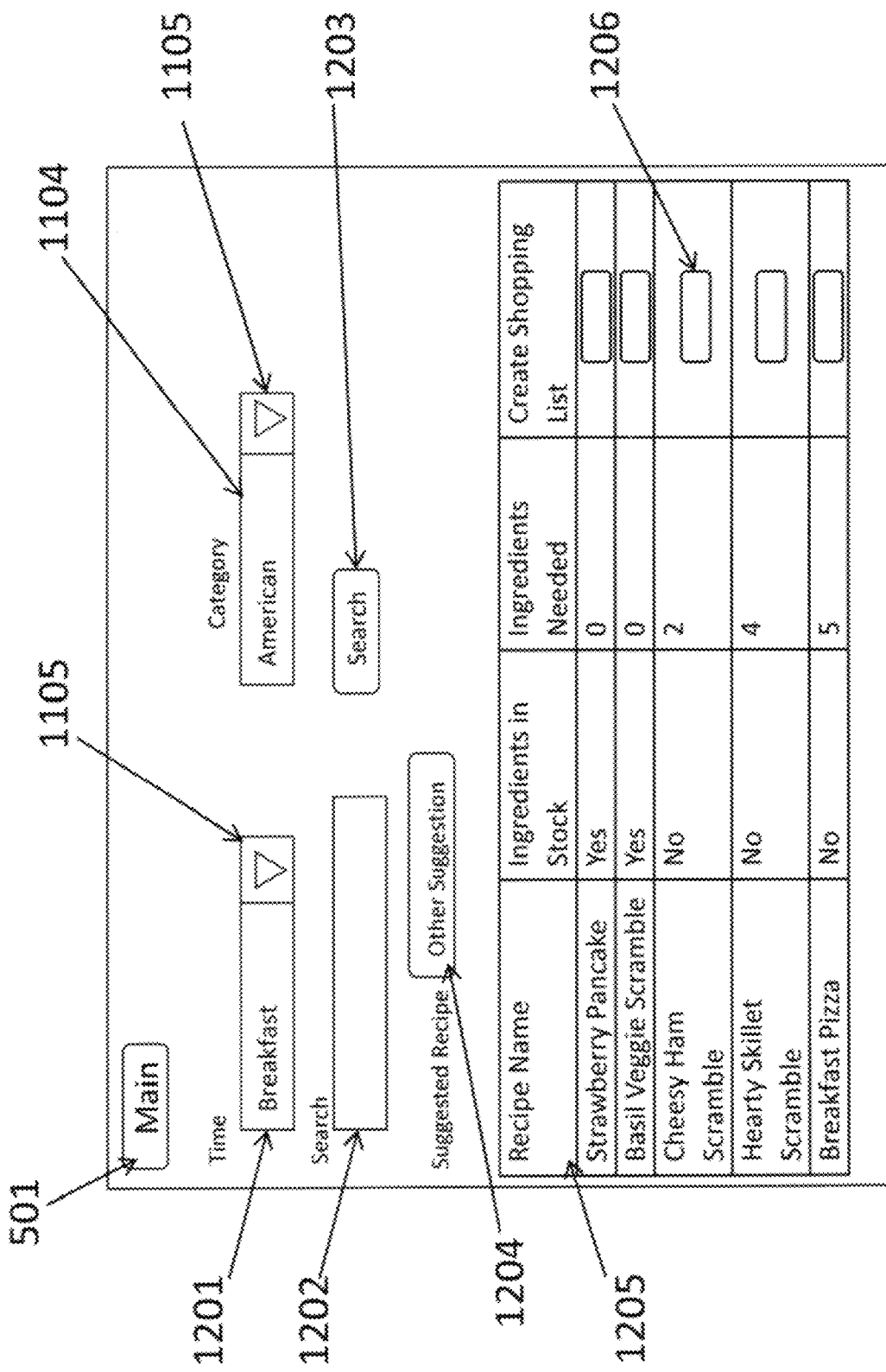
FIG. 12 is an embodiment of a sub-screen for recipe suggestions and creating shopping lists.

FIG. 12 is an embodiment of a sub-screen for recipe suggestions and creating shopping lists. FIG. 12 includes a graphic "Main" button 501, a graphic text box 1104, a drop-down arrow 1105, a graphic text box 1201, a graphic text box 1202, a graphic "Search" button 1203, a graphic "Other Suggestion" button 1204, a recipe table 1205, and a check box 1206. In FIG. 12, the sub-screen shown appears when a user selects the graphic "Today's Recipe" button 114 on the main screen shown in FIG. 1. The sub-screen shows a table listing suggested recipes based on the inventory list. The user may select search parameters such as time of day in text box 1201 by selecting drop-down arrow 1105. Other search parameters include category of recipe in text box 1104 and specific terms in text box 1202. Recipe ideas may be suggested by selecting graphic "Other Suggestion" button 1204. Recipe table 1205 may be configured to show the recipe name, whether all of the ingredients are in stock, and the number of ingredients that are needed. A user may select a check box in the "Create Shopping List" column to generate a shopping list of items needed for a certain recipe. For example, a user may desire to make "Cheesy Ham Scramble" and selects check box 1206 for the two ingredients that are needed to follow the recipe. The software may be configured to allow the user to do this with the device at home or with mobile device software on the go or at the store. Graphic "Main" button 501 may be selected at any time to return to the main screen shown in FIG. 1.

FIG. 13 is an embodiment of a sub-screen for a calendar with memo capability. FIG. 13 includes a graphic "Main" button 501, a graphic left-pointing triangle button 1301, a current month and year 1302, a graphic right-pointing triangle button 1303, a graphic star button 1304, and a graphic calendar box 1305. In FIG. 13, a user may select graphic left-pointing triangle button 1301 to view a previous month. A user may view the next month by selecting graphic right-pointing triangle button 1303. Between the two graphic triangle images is displayed the current month and year 1302 displayed on the sub-screen at the moment. A user may select any calendar date box within the graphic calendar box to add a memo, such as graphic calendar box 1305. When a calendar box is selected, a sub-screen will be displayed as shown in FIG. 14. A calendar date box that has a memo will display graphic star button 1304, such as on calendar date boxes 17 and 22. Graphic "Main" button 501 may be selected at any time to return to the main screen shown in FIG. 1.

FIG. 14 is an embodiment of a sub-screen for a calendar memo. FIG. 14 includes a graphic "Go back to Calendar" button 1401, a text box 1402, a graphic alphanumeric keyboard 605, a graphic "Delete Memo" button 1403, and a graphic "Save" button 1404. In FIG. 14, a sub-screen for entering memos for a specific date is shown after selecting a calendar date box as discussed in FIG. 13. A user may type a memo using graphic alphanumeric keyboard 605, wherein the text would be configured to appear in text box 1402. The memo in text box 1402 may be deleted by selecting graphic "Delete Memo" button 1403. The memo in text box 1402 may be saved by selecting graphic "Save" button 1404. A user may go back to the calendar by selecting graphic "Go back to Calendar" button 1401.

Electronic device 100 may have a connected speaker assembly that converts an electrical signal from control system into an audible sound through speaker 127 as illustrated in FIG. 1. The speaker assembly may be mounted to the housing of electronic device 100 such that audible sound from speaker 127 has access to the exterior of the housing of electronic device 100 where it then may be heard in the surrounding environment. The purpose of speaker 127 may be to allow the user to receive an auditory signal audible messages from electronic device 100 signifying a change in status or that an event has occurred whereby electronic device 100 notifies user of this change in event or status. In some embodiments speaker 127 may be connected to a microphone such as microphone 128 that allows for the passage of sound to receive auditory signals from a person in proximity. Electronic device 100 may also have the necessary circuitry to amplify and convert the signal to speaker 127 and to convert the signal from microphone 128.

In one or more non-limiting embodiments image recognition application program interface (API) may have a digital assistant module operable to perform and implement various types of function, actions, and operations for electronic device 100 with input from microphone 128 and output through speaker 127. Digital assistant module may be activated in the settings or automatically enabled. Electronic device 100 may pick up the voice of the household and family members and add/subtract/report the items in the refrigerator/kitchen cabinets. Users of electronic device 100 may audibly insert a statement or question through microphone 128 and receive a response from digital assistant module that may be audibly presented to user through speaker 127.

Digital assistant module may utilize speech to text whereby digital assistant module generates a set of candidate text interpretations of an auditory signal such as the vocal commands from user. Digital assistant module may employ statistical language models to generate candidate text interpretations of the auditory signals from user whereby digital assistant module may analyze the text interpretations and transmit a notification in response. For example, when user places two carrots into the refrigerator, instead of scanning the barcode or taking an image shot in front of camera lens 106, user may say such as "I am putting in 2 carrots into the refrigerator" and digital assistant module may receive the audio input and convert the audio input into text and analyze the text to accordingly update device's database. In some embodiments, digital assistant module may provide an action whereby digital assistant module may transmit a notification pertaining to acknowledgement of users audible input.

Users may assign a nickname to electronic device 100 through user interface such as "Leah" such that digital assistant module analyzes first that user has said the assigned nickname and then analyzes the audible inputs following the assigned nickname.

Users may assign a nickname a location of electronic device 100 through user interface such as "Freezer, Refrigerator, and the Pantry" or "Bathroom, Kitchen, Bedroom" such that digital assistant module analyzes first that user has said the assigned nickname a location of electronic device 100 and then analyzes the audible inputs following the assigned nickname a location of electronic device 100 corresponding to that location. This helps if user has multiple electronic devices 100 but only the desired electronic device 100 analyzes the command.

User may say, "Leah", I am putting in 2 carrots into the refrigerator" then digital assistant module automatically adds 2 carrots to the inventory database. The owner may not even say "refrigerator", in the sentence. Digital assistant module may assume that the owner is putting it into the refrigerator when the food item is sure to be in the refrigerator and transmit an audible alert through speaker that digital assistant module cannot determine where the user would put a particular food item, like raw chicken. Digital assistant module may provide an action whereby digital assistant module may transmit a notification asking the user the expiration date for the food item if the user did not specify the expiration date. Digital assistant module may receive the audio input from user and covert the audio input into text and analyze the text to accordingly update device's database.

When taking out some food items from the refrigerator, user may say "Leah, I am taking out 2 eggs, 1 pack of bacon, and 2 carrots." Digital assistant module may receive the audio input from user and convert the audio input into text and analyze the text to accordingly update device's database. Then the device will take out those items from the inventory database.

The user may say, "Leah, make a list of food recipes that can be made out of ingredients in the refrigerator." Digital assistant module may receive the audio input from user and convert the audio input into text and analyze the text to accordingly update device's database. Digital assistant module may then generate possible top 10 food recipes and transmit a notification whereby the cooking steps may be displayed on the screen to user.

There are other commands that may be utilized with the device. For example, user may say, "Leah, what are the items that are going to be expired in 2 days?" Digital assistant module may receive the audio input from user and covert the audio input into text and analyze the text to accordingly update device's database. Digital assistant module may transmit an audible alert through speaker 127 telling electronic device 100 put the item names on transmitting a notification that is presented on screen for display to user so that they may consume those items as soon as possible. User may also ask the device for already expired items so that the owner can purge out the items from the refrigerator/cabinet in a similar fashion.

In other embodiments, image recognition application program interface (API) may have an ordering module for a user requiring replenishment, replacement, or upgrade of items in the refrigerator or other storage location. User may register electronic device 100 through image recognition application program interface (API) with one or more subscription programs so that electronic device 100 is associated with a subscription program to order one or more items from the subscription program. Users may also authorize subscription program access through user interface of image recognition application program interface (API) whereby when a subscription program is linked, access may be granted to various accounts of user and importing and exporting of data from those accounts may occur.

For example, if a user is taking out the last milk carton or the egg carton, databases may be updated whereby electronic device 100 may transmit a notification either presenting information on the screen or digital assistant module may audibly transmit a notification to the user asking if user wishes to order the same item through the subscription program. A user may also manually order one or more items by audibly transmitting a request or through the user interface of screen on electronic device 100.

To order more items, users may input their credit card or debit card information for a credit card or debit card using any card known in the art, including, without limitation an ATM card, a VISA®, MasterCard®, Discover®, or American Express® card in a credit card input field through image recognition application program interface (API) or subscription program, or can alternatively use PayPal® Squarepay® or the like. Credit card and debit card information may be stored in databases such that they may be used again.

Ordering module may utilize demand-based ordering subsystems whereby the type, amount, and how frequent items are consumed, thrown out, or ordered by a user may be analyzed by image recognition application program interface (API). User interface of image recognition application program interface (API) or connected subscription platforms may provide options for users to opt into demand-based ordering whereby items may be ordered at a predetermined time when an action occurs. Actions may be any number of occurrences such as when the amount of items reaches or drops below a certain threshold percentage when divided by the overall items originally stored in refrigerator over a period of time or at a single time (for instance <20%).

Ordering module may also determine appropriate actions for special types of users, such as to determine rate of consumption or necessary requirements of certain items based upon the information generated by the user whereby user may initially register a profile associated with image recognition application program interface (API). User may insert information pertaining to but not limited to age, location, height, weight, BMI, and dietary restrictions. The profile information may alter the occurrence of actions to provide a more personalized demand based ordering system. For instance, if user has a high BMI, unhealthy items may be ordered to be delivered after a predetermined time, at a decreased rate, or after BMI has returned to a predetermined range.

While preferred and alternate embodiments have been illustrated and described, as noted above, many changes can be made without departing from the spirit and scope of the Food Inventory Device. Accordingly, the scope of the Food Inventory Device is not limited by the disclosure of these preferred and alternate embodiments. Instead, the scope of the Food Inventory Device should be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions. The reader's attention is directed to all papers and documents which are filed concurrently with this specification and which are open to public inspection with this specification, and the contents of all such papers and documents are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features. Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶116.

What is claimed is:

1. A food inventory system comprising:
   one or more databases, the one or more databases stored in a memory, wherein at least one database is an inventory database, the inventory database comprising one or more inventory items placed in a storage container;
   one or more processors coupled to the one or more databases;
   a camera having a camera lens, the camera configured to capture identifying information of the one or more inventory items, wherein the identifying information of the one or more inventory items is searched using an image recognition API stored in the memory to recognize the one or more inventory items whose identifying information has been captured by the camera; and
   a computing device coupled to the one or more processors and the one or more databases; wherein the one or more processors are configured to:
   updating the inventory database with the one or more inventory items by capturing the identifying information of the one or more inventory items being placed in the storage container;
   updating the inventory database by capturing the identifying information of the one or more inventory items being removed from the storage container;
   presenting a user interface on the computing device, wherein the user interface comprises a display of a listing of the one or more inventory items in the storage container from the inventory database along with variable details; the one or more inventory items in the storage container sortable by details comprising storage date, category type, name of the one or more inventory items in the storage container, number of days the one or more inventory items in the storage container were stored in the storage container, expiration date of the one or more inventory items in the storage container, and quantity of the one or more inventory items in the storage container;
   automatically ordering inventory items wherein a percentage of a particular inventory item located in the storage container drops below a predetermined percentage; and
   receiving a BMI in a user profile and altering or decreasing a rate of the automatically ordering of the particular inventory item of the one or more inventory items based upon the BMI.

* * * * *